(12) United States Patent
Fava

(10) Patent No.: US 11,872,621 B2
(45) Date of Patent: Jan. 16, 2024

(54) COMPACT AND PREASSEMBLED AUTOMATIC PROCESSING SYSTEM

(71) Applicant: Starmatik Srl Uninominale, Spresiano (IT)

(72) Inventor: Stefano Fava, Spresiano (IT)

(*) Notice: Subject to any disclaimer, the term of this patent is extended or adjusted under 35 U.S.C. 154(b) by 470 days.

(21) Appl. No.: 17/285,881

(22) PCT Filed: Oct. 19, 2018

(86) PCT No.: PCT/IB2018/058135
§ 371 (c)(1),
(2) Date: Apr. 15, 2021

(87) PCT Pub. No.: WO2020/079477
PCT Pub. Date: Apr. 23, 2020

(65) Prior Publication Data
US 2021/0346937 A1 Nov. 11, 2021

(30) Foreign Application Priority Data
Oct. 18, 2018 (IT) .......................... 102018000009564

(51) Int. Cl.
*B21D 43/10* (2006.01)
*B21D 43/24* (2006.01)
(Continued)

(52) U.S. Cl.
CPC .......... *B21D 55/00* (2013.01); *B21D 37/145* (2013.01); *B21D 43/023* (2013.01);
(Continued)

(58) Field of Classification Search
CPC .... B23Q 7/046; B23Q 41/02; B23Q 2707/06; B21D 55/00; Y10T 29/5124;
(Continued)

(56) References Cited

U.S. PATENT DOCUMENTS 7,179,043 B2 * 2/2007 Jager ...................... B23Q 1/623
901/6
8,371,797 B2 * 2/2013 Bonhomme ........... B65G 57/00
74/612

(Continued)

FOREIGN PATENT DOCUMENTS

EP  2484460 A1  8/2012
JP  S5977526 U  5/1984
(Continued)

OTHER PUBLICATIONS

EPO Machine Translation of JPH06179023A—Yoshida et al., "Metal Sheet Feeding Mechanism", Jun. 28, 1994.*
(Continued)

*Primary Examiner* — Erica E Cadugan
*Assistant Examiner* — Michael Vitale
(74) *Attorney, Agent, or Firm* — Themis Law

(57) ABSTRACT

An automatic processing system includes a base or platform, on which a loading station is mounted, adapted to house one or more trolleys having workpieces to be processed, a magazine adapted to pick up at least one work piece at a time from the loading station and to transport it to a centering device adapted to receive the workpiece and to place it in pick-up position by a robot, and a unloading station where the processed pieces are positioned.

11 Claims, 5 Drawing Sheets

(51) Int. Cl.
  *B21D 55/00*    (2006.01)
  *B21D 37/14*    (2006.01)
  *B21D 43/02*    (2006.01)
(52) U.S. Cl.
  CPC .......... B21D 43/105 (2013.01); B21D 43/24 (2013.01); *Y10T 29/5124* (2015.01); *Y10T 483/16* (2015.01); *Y10T 483/1731* (2015.01)
(58) Field of Classification Search
  CPC .............. Y10T 483/16; Y10T 483/165; Y10T 483/1729; Y10T 483/1731
  USPC ............................ 483/14, 15, 28, 29; 29/563
  See application file for complete search history.

(56) References Cited

U.S. PATENT DOCUMENTS

| | | | | |
|---|---|---|---|---|
| 2001/0003861 | A1* | 6/2001 | Mayr | B23P 21/004 29/407.04 |
| 2008/0040911 | A1* | 2/2008 | De Koning | G05B 19/41825 483/1 |
| 2016/0114444 | A1* | 4/2016 | Hofmann | B23Q 3/15536 483/1 |
| 2019/0101901 | A1* | 4/2019 | Zimmermann | G05B 19/41815 |
| 2020/0023481 | A1* | 1/2020 | Imboden | B23P 23/00 |
| 2020/0198077 | A1* | 6/2020 | Andujo | B21D 43/105 |

FOREIGN PATENT DOCUMENTS

| | | | | |
|---|---|---|---|---|
| JP | H06179023 | A | | 6/1994 |
| JP | 06234018 | A * | | 8/1994 |
| JP | 07097060 | A * | | 4/1995 |
| JP | 2013116477 | A * | | 6/2013 ............. B23K 26/38 |
| WO | WO-9511767 | A1 * | | 5/1995 ............. B21D 11/20 |
| WO | WO-2015169918 | A2 * | | 11/2015 ............. B23Q 41/02 |
| WO | 2017072725 | A1 | | 5/2017 |

OTHER PUBLICATIONS

Liebler, B.C., Tendens zu Blech-Bearbeitungszentren, WErkstatt + Betrieb, Carl Hanser Verlag, München, DE vol. 126, No. 9, Sep. 1, 1993, pp. 573-578 pp. 4, 5; fig. 18.

* cited by examiner

COMPACT AND PREASSEMBLED AUTOMATIC PROCESSING SYSTEM

This patent relates to automatic processing systems and in particular concerns a new compact and pre-assembled automatic processing system, with a protection system equipped with at least one movable wall.

Prior art already includes automatic processing systems with mechanical presses which perform different operations on workpieces, such as bending, punching, etc.

Normally such systems comprise a plurality of devices which work in synchrony, including: a system for loading workpieces, a robot which moves each workpiece to be processed, at least one mechanical press which performs the processing operations on the workpiece.

Generally, the systems of the prior art also comprise one or more tool magazines, from which the robot takes the machining tools to be installed on the press according to the processing to be performed, and the gripping tools with which the robot grasps and holds the workpieces, depending on the shape and dimensions of the workpiece itself. The known systems are furthermore equipped with means and devices designed to guarantee the correct positioning of the workpiece to be picked up by the robot, workpiece control devices, for example to measure thickness in the case of pieces made of metal plates, and control devices in general.

In addition, the systems of the prior art must comprise suitable protective walls, which prevent unauthorized access throughout the processing area, as well as limiting, for example, noise pollution. Normally these walls are arranged so as to completely circumscribe the loading area, the robot's operating area, and the area where the moving parts of the press operate.

These walls must obviously comprise openings through which the trolleys access the area to load the workpieces to be processed and through which the processed pieces leave the processing area to be sent to subsequent processes.

When the trolleys are located inside the space circumscribed by the walls, they obstruct the openings, preventing access by unauthorized persons. In contrast, when the trolleys are removed to be reloaded, the aforementioned openings remain unobstructed, therefore, nothing prevents access.

Currently, the installation procedure for processing systems is very complex, and must be done in compliance with accepted standards in order to guarantee the required processing precision.

In particular, the position in which the workpiece to be loaded is positioned must be precisely defined with respect to the position of the robot, as well as the position of the press and tool magazines. In fact, even minute errors completely compromise the precision. Likewise, the dimensions of the devices that make up such a system must also be absolutely and precisely defined. In addition, the horizontality of the support surface as well as the parallelism and orthogonality in the positioning of the devices must be ensured.

Therefore, at present, the construction of the individual system components is carried out/completed in the production plant, while the assembly of the system takes place in the final facility where the system will actually be used, and from there on, it can no longer be moved unless complex and lengthy dismantling, handling, re-installation and calibration operations are carried out elsewhere.

Furthermore, before installation, it is necessary to verify the horizontality of the support surface and the proper positioning of each of the system components to be installed.

The object of the present patent is a new compact and preassembled automatic processing system, with a protection system with at least one movable wall.

The main object of the present invention is to provide for faster, simpler and safer installation procedures than systems in the prior art.

Another object of the present invention is to facilitate the calibration operations for the entire assembly.

One advantage of the present invention is that it is modular, thus able to comprise presses of various types and dimensions, using dedicated connection and support structures.

Another object of the present invention is to prevent unauthorized access even when changing the loading trolleys, enabling continuous operation without operating stops to load/unload the materials being processed.

Still another object of the present invention is to be transportable already pre-assembled.

These and other objects, direct and complementary, are achieved by the new compact and preassembled automatic processing system, with a protection system comprising at least one movable wall.

In its main parts the new system comprises:
- a loading station, designed to house one, two, or more trolleys with the workpieces to be processed;
- a feeder, suited to pick up at least one piece at a time from the loading zone and transport it to a centring device;
- the at least one centring device, suited to receive the workpiece and to place it in a picking position by a robot;
- at least one tool magazine for a machine tool;
- at least one magazine for gripping tools for at least one robot suited to move the workpieces;
- the at least one robot, with at least one mechanical arm suited to: pick up and mount the gripping tools; pick up and mount the tools for the machine tool; pick up the workpieces from the centring device; move the workpieces during processing in the machine tool; position the processed workpieces on at least one device or unloading station;
- a base or platform on which the at least one loading station, feeder, centring device, tool magazines, robot and at least one unloading station are mounted in defined positions.

This base or platform comprises adjustable feet for levelling.

The system also comprises at least one press, suited to perform one or more processes on the workpiece, and at least one base or support structure on which the at least one press is mounted, and where the base or platform comprises fastening means to connect the support structure, the fastening means being positioned preferably along or near an edge of the platform so that the press is arranged adjacent to the platform and, therefore, in a correct and precise manner with respect to the robot.

The new system also comprises protective walls, assembled substantially along the perimeter of the base or platform, so as to contain all the working members installed. The system also comprises additional protective walls, assembled substantially around the press, and joined to the protective walls mounted on the platform.

The protective walls comprise at least one opening to allow one or more loading trolleys to be placed in the loading station. The loading station comprises at least one holding zone of the one or more trolleys and at least one movable wall, suited to be selectively positioned to close the opening once one of the trolleys has been removed, so as to prevent unauthorized access in the area where the operations are carried out, but without impeding the normal trolley introduction/removal operations.

These perimeter protective walls also comprise one or more shaped walls around the opening of the unloading zone, where a conveyor belt is preferably mounted.

The new system is thus pre-assembled in the production plant, where all the devices are positioned on the platform and fastened with precision in the proper relative position and at the correct height with respect to the plane of the platform.

The means for constraining the press support structure are also provided, where the fastening means are appropriately positioned on the platform so that, once the system is positioned in the facility where it will be used, the press with the relative support structure must be simply installed, thus ensuring the exact position of the press with respect to the other components of the system.

The platform further comprises suitable anchorage points for lifting members, so that the system, without the press and support structure, can be lifted and transported, for example loaded into a container or suitable means of transport and then unloaded and placed in the facility where it will be used.

By adjusting the platform's feet, it is possible to adjust the horizontality of the system, once positioned on the final support surface, and then constrain it to the ground by means of special fixing systems.

Finally, the system includes at least one command and control station suitable for programming/controlling the movement of all moving parts. The command and control station also includes an appropriate display and/or a control panel accessible to an operator, for example installed outside the protective walls or even in a remote position.

The characteristics of the new system will be better clarified by the following description with reference to the drawings, attached by way of a non-limiting example.

FIG. 1 shows a plan view of one possible embodiment of the new system (1), while

Figure 1:
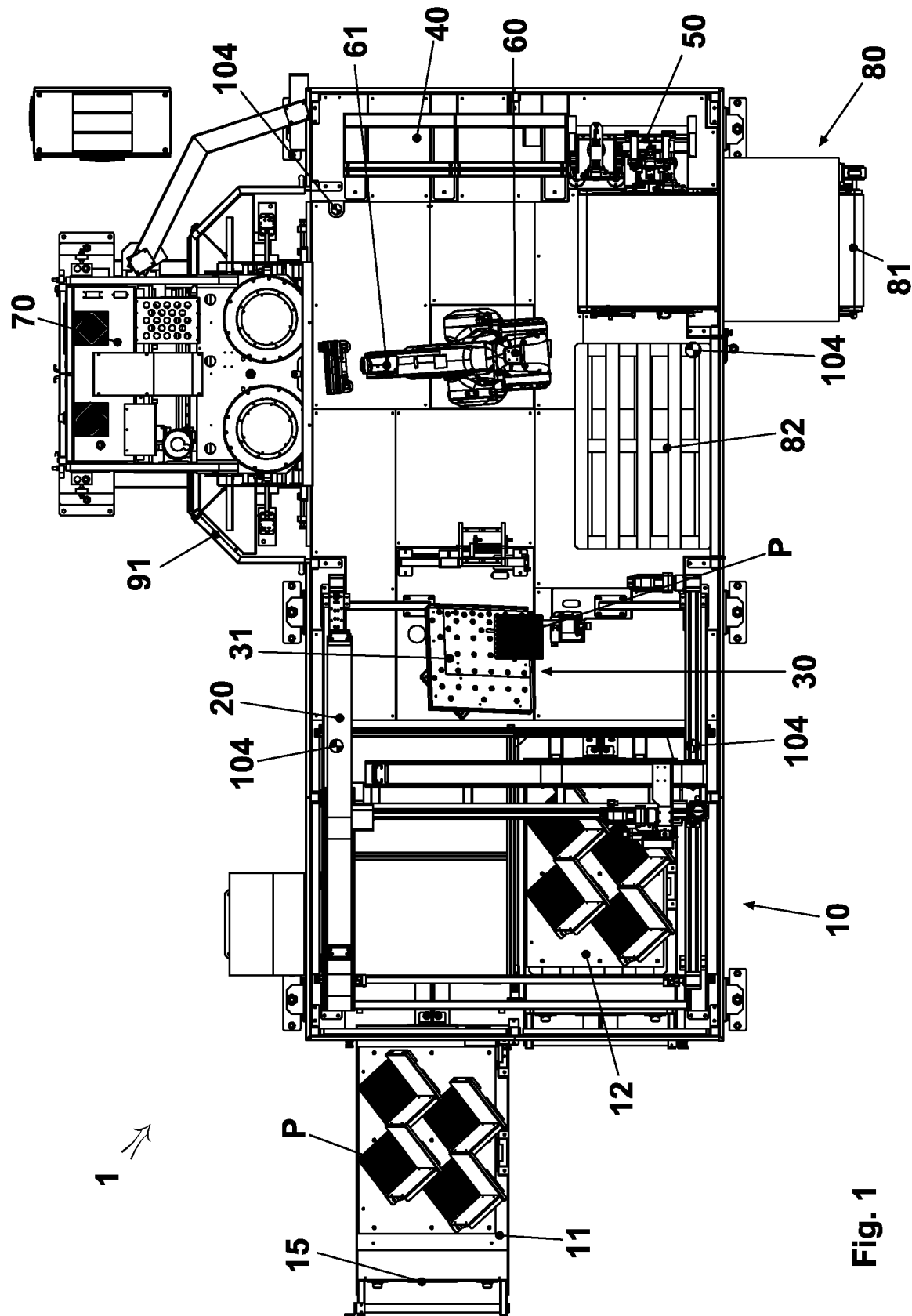
Figure 2:
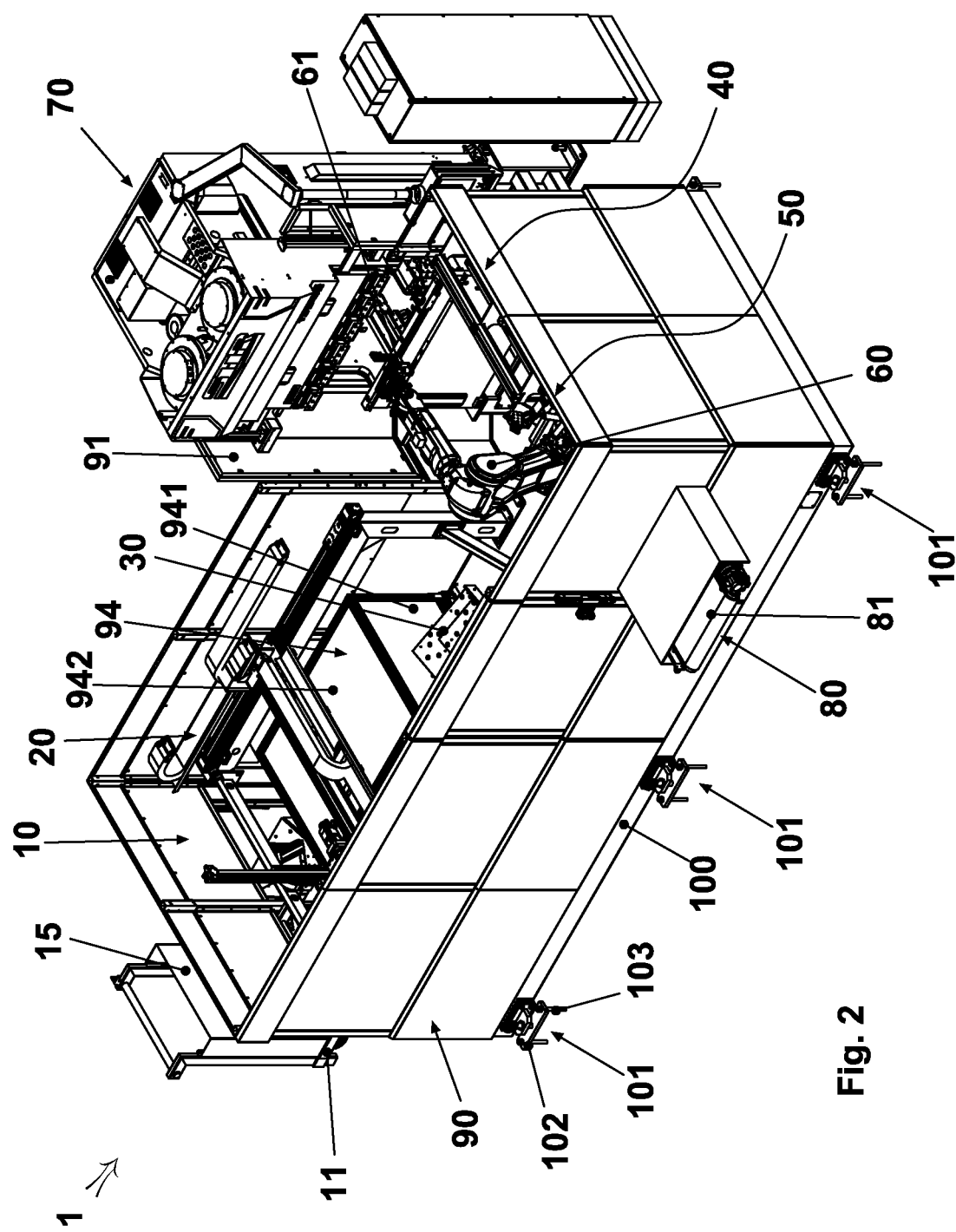
FIG. 2 shows a three-dimensional view thereof.
Figure 3:
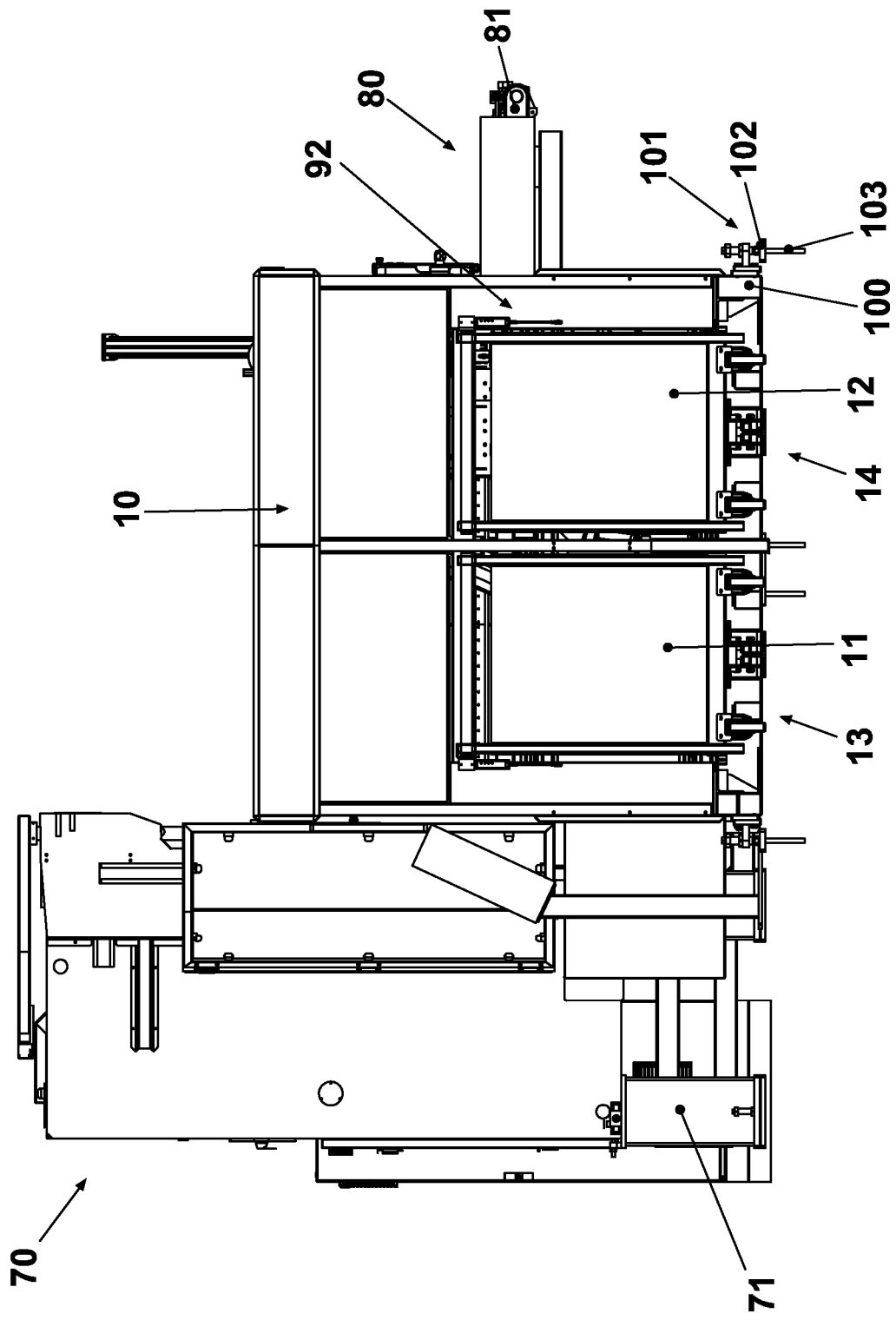
FIG. 3 shows a side view of the new system (1).

The new compact and preassembled automatic processing system (1) comprises a base or platform (100) in turn equipped with adjustable feet (101), in turn comprising plates (102) suitable to constrain it to the ground by fixing means (103).

The platform (100) also comprises suitably distributed anchorage points (104) for lifting members.

A loading station (10) is installed on the platform (100), designed to house one or more trolleys (11, 12) with the workpieces (P) to be processed.

In the example in the figures, there are two trolleys (11, 12) and each one is positioned in a holding area (13, 14) of the loading station (10).

A feeder (20) is also installed on the platform (100), suited to pick up at least one workpiece (P) at a time from the loading zone (10).

The feeder (20) is preferably the type moving on Cartesian axes, comprising a cart (21) which moves in two horizontal directions (X, Y) and orthogonal to each other, and a gripping device (22) suited to move vertically with respect to the cart (21). The cart (21) moves above the trolleys (11, 12) positioned in the loading station (10) and the gripping device selects and picks up the workpiece (P) to be processed, which is then transported outside of the loading station (10), to a centring device (30).

The at least one centring device (30) is also installed on the platform (100) and is suited to receive the workpiece (P) and place it in a pick-up position by a robot (60). The centring device (30) comprises, for example, a tilting plane (31) on which a reference point or zero point is identified. When a workpiece (P) is positioned on the plane (31), the latter moves to an inclined pick-up position so that the workpiece (P) is arranged in a precise position with respect to the zero point.

At least one tool magazine (40) for a machine tool (70) and at least one magazine (50) for gripping tools for at least one robot (60) suited to move the workpieces is also installed on the platform (100).

The at least one robot (60) is also installed on the platform (100) with at least one mechanical arm (61) suited to: pick up and mount the gripping tools; pick up and mount the tools for the machine tool; pick up the workpieces from the centring device; move the workpieces during processing to the machine tool; positioning the processed workpieces on at least one device or unloading station (80).

The system (1) also comprises at least one machine tool, and in particular at least one press (70), suited to perform one or more machining operations, such as for example bending and/or drilling and/or punching in general.

The press (70) has operative members which require tools which can be selected from the tool magazine (40).

The press (70) is in turn mounted on a base or support structure (71) comprising fastening means to fasten it to the platform (100) in an appropriate position and manner, such that the press (70) is therefore arranged side by side with the platform (100) and in a precise and defined position with respect to the robot (60).

The new system (1) also comprises at least one unloading station (80), in correspondence with which a conveyor belt (81) is installed, mounted on the platform (100) and suited to transport the processed workpieces (P) placed by the robot (60) in the unloading station, to an area external to the platform (100), where they can be picked up and sent for further processing.

The system may also have an additional unloading station (82) positioned on the platform (100) and thus inside the system (1). In this case, access to this further unloading station (82) requires stopping the work cycle.

The new system (1) also comprises protective walls (90) mounted substantially along the perimeter of the platform (100), which define a space in which all the working members installed on the platform (100) are contained.

The system (1) conveniently also comprises additional protective walls (91), mounted substantially around the press (70), and joined to the protective walls (90) mounted on the platform (100).

These protective walls (90) mounted on the platform (100) comprise at least one opening (92) for access to the loading station (10), to allow the introduction of the trolleys (11, 12) into the respective holding zones (13, 14).

Figure 4A:
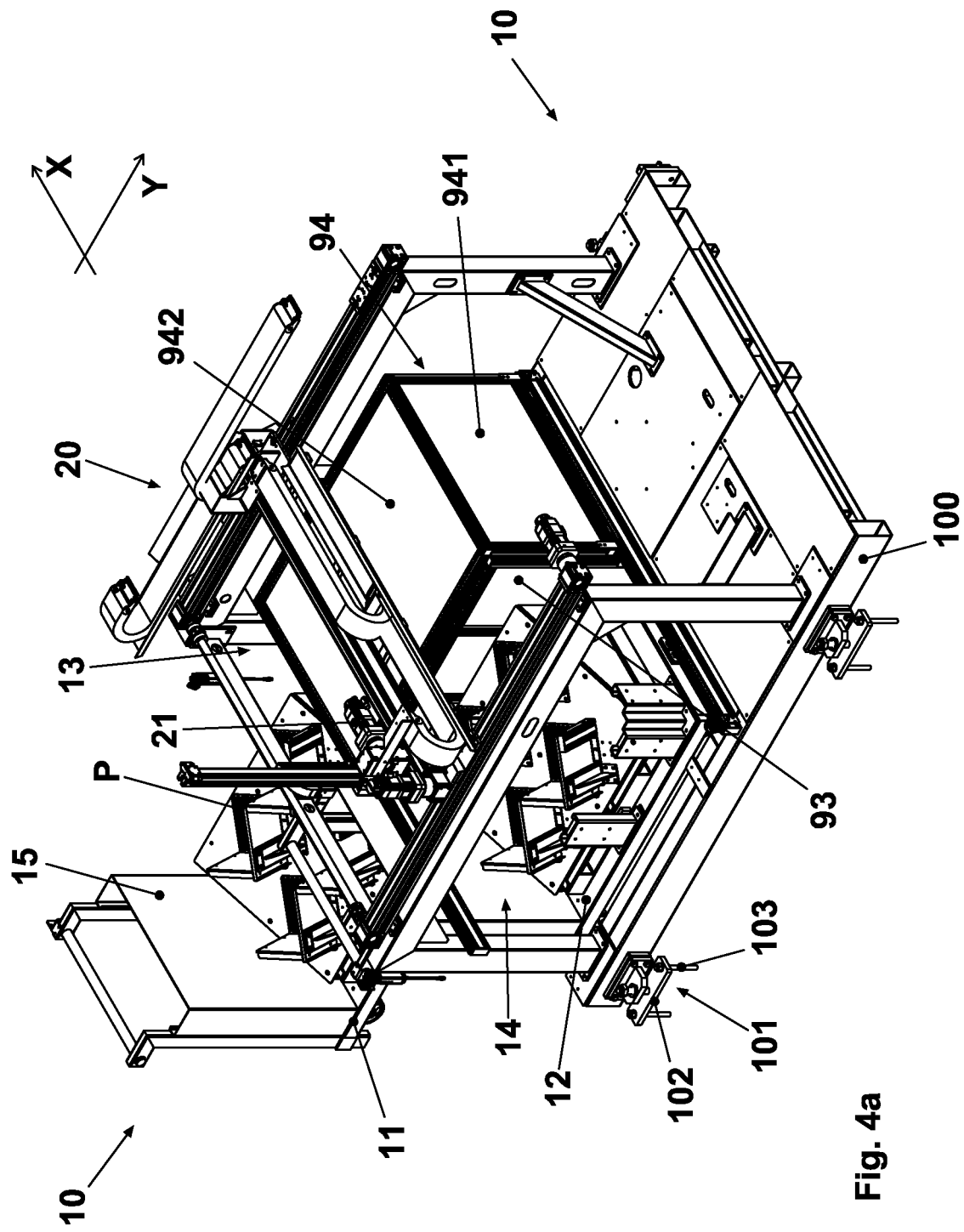
FIGS. 4a and 4b show in detail two three-dimensional views of the loading station (10), with two trolleys (11, 12), one of which is removed from the relative holding zone (13), and with a movable wall (94) positioned so as to prevent access to the holding zone.
Figure 4B:
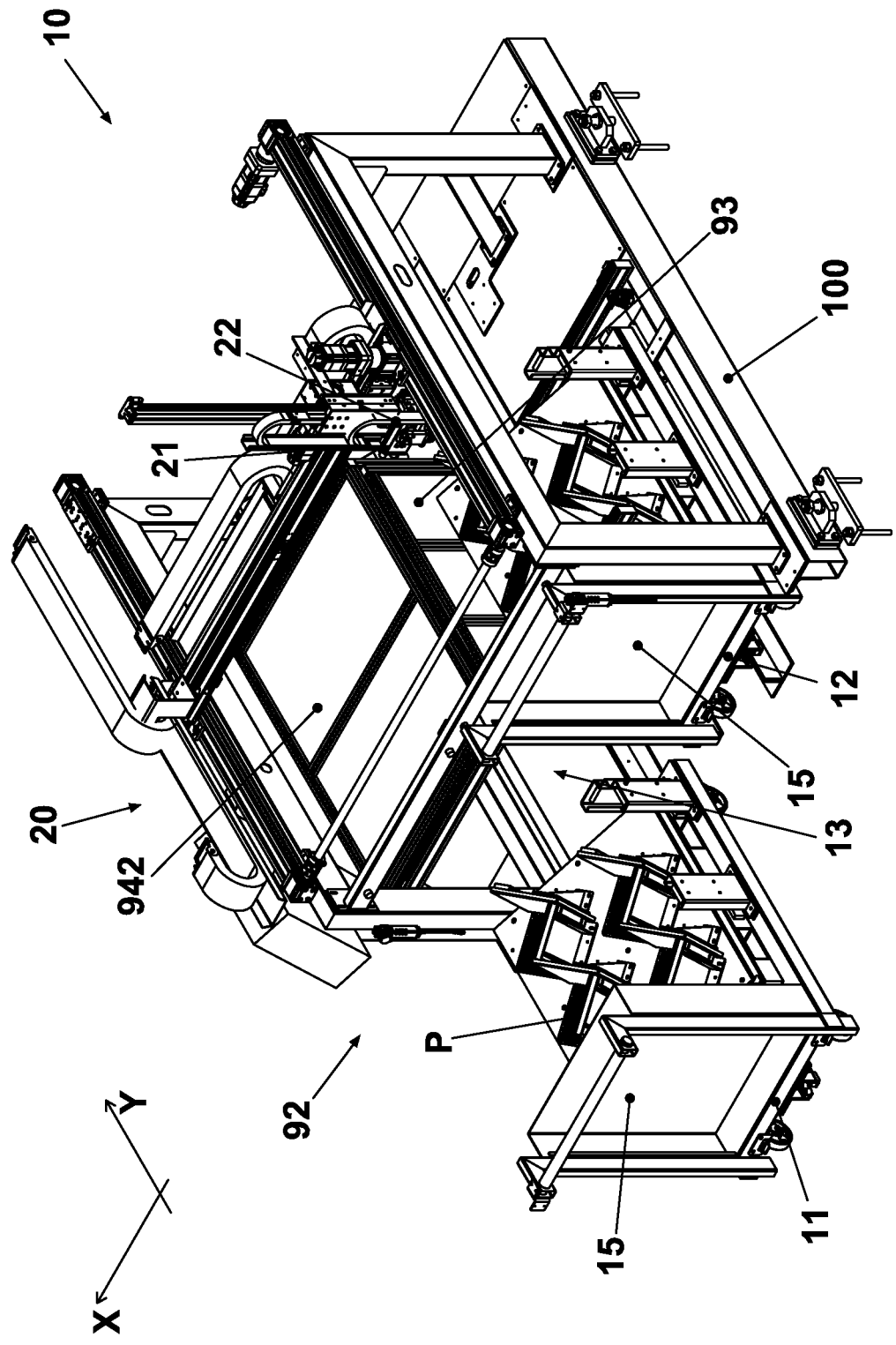

In the embodiment shown in FIGS. 4a and 4b, the trolley (11, 12) holding zones (13, 14) are separated from each other by at least one partition (93).

When the trolleys (11, 12) are correctly positioned in the relative holding zones (13, 14), the rear wall (15) of each trolley (11, 12) prevents access from the outside towards the inside of the loading station (10), thus preventing access by persons within the space delimited by the protective walls (90).

As noted, the system (1) preferably operates with at least two trolleys (11, 12) side by side, each one located in its own holding zone (13, 14) in the loading station (10), where the Cartesian axis feeder operates (20).

In this way, when one of the two trolleys (11, 12) is empty, the processing can continue by taking the workpieces to be processed from the second trolley, while the first trolley is removed, reloaded, and reintroduced.

The protective walls (90) comprise at least one movable wall (94) suited to be selectively positioned to close a part of the opening (92), in correspondence with the position of the trolley (11, 12) which has been removed for the loading operations.

In order not to impede the trolley (11, 12) introduction/removal operations in any way, the movable wall (94) is placed in a frontal position with respect to the trolleys (11, 12) positioned in the holding zones (13, 14), that is, positioned to separate the holding zone (13, 14) from the rest of the space defined by the safety walls (90).

The movable wall (94) may also comprise a vertical portion (941) and a horizontal roof (942) which is superimposed over the holding zone (13, 14).

Consequently, when a trolley (11, 12) is removed from the relative holding zone (13, 14), the movable wall (94) is placed in correspondence with the empty holding zone, so that any access is allowed only inside the empty holding zone, but not inside the area where the working members are moving. This roof (942) also provides protection from above.

In the embodiment in the figure, the holding zones (13, 14) are side by side (X) in a direction parallel to a translation direction of the cart (21) of the Cartesian feeder (20). Therefore, to selectively close one of the holding zones (13, 14), the movable wall (94) must substantially translate in this direction. This translation is usefully performed by the Cartesian feeder (20) which, before the removal of the empty trolley, translates the movable wall (94) in correspondence with the relative holding zone.

These specifications are sufficient for the expert person to make the invention, as a result, in the practical application there may be variations without prejudice to the substance of the innovative concept.

Therefore, with reference to the preceding description and the attached drawings the following claims are made.

The invention claimed is:

1. An automatic processing system (1), comprising:
   a loading station (10), adapted to house one or more trolleys (11, 12) having workpieces (P) to be processed;
   a feeder (20), adapted to pick up a workpiece (P) at a time from said loading station (10) and to transport said workpiece (P) to a centering device (30);
   said centering device (30), adapted to receive said workpiece (P) and to place said workpiece in a pick-up position by a robot (60);
   said robot (60), having at least one mechanical arm (61), being adapted to move said workpiece (P) during processing in a machine tool;
   an unloading station (80), where processed workpieces (P) are positioned; and
   a base or platform (100), on which said loading station (10), said feeder (20), said centering device (30), said robot (60), and said unloading station (80) are mounted, wherein said loading station (10) comprises a plurality of holding zones (13, 14) disposed side by side, at least one trolley (11, 12) being positioned in each of the plurality of holding zones with the workpieces (P) to be processed, and wherein said holding zones (13, 14) are separated from each other by at least one partition.

2. The automatic processing system (1) according to claim 1, wherein said base or platform (100) comprises adjustable feet (101).

3. The automatic processing system (1) according to claim 1, further comprising:
   at least one first magazine (40) for tools for at least one machine tool; and
   at least one second magazine (50) for gripping tools for said robot (60);
   wherein said first and said second magazines (40, 50) are mounted on said base or platform (100).

4. The automatic processing system (1) according to claim 1, further comprising a machine tool, said machine tool comprising press (70), adapted to perform one or more machining operations on said workpiece, and a base or support structure (71) on which said press (70) is mounted, wherein said base or platform (100) comprises fastening means of said support structure (71).

5. The automatic processing system (1) according to claim 4, wherein said support structure (71) is integral with said platform (100).

6. The automatic processing system (1) according to claim 1, wherein said feeder (20) is of movement type on Cartesian axes, said feeder comprising a cart (21) which moves in two horizontal directions (X, Y) orthogonal to each other, further comprising a gripping device (22) adapted to move vertically with respect to said cart (21) above said loading station (10).

7. The automatic processing system (1) according to claim 6, further comprising protective walls (90) mounted along a perimeter of said base or platform (100), the protective walls defining a space in which all working members installed on said base or platform are contained (100), wherein said protective walls (90) comprise at least one opening (92) for introducing/removing said one or more trolleys (11, 12) into/from the respective holding zones (13, 14) of said loading station, and wherein said protective walls (90) comprise a movable wall (94) adapted to be selectively positioned to close a part of said opening (92), in correspondence with a position of one of the one or more trolleys (11, 12) which has been removed for loading operations.

8. The automatic processing system (1) according to claim 7, wherein said movable wall (94) is arranged to selectively separate at least one of said holding zones (13, 14) from a rest of a space defined by said protective walls (90).

9. The automatic processing system (1) according to claim 7, wherein said movable wall (94) comprises a vertical portion (941) and a horizontal roof (942), which is superimposed on at least one of said holding zones (13, 14).

10. The automatic processing system (1) according to claim 7, wherein said plurality of holding zones (13, 14) are parallel to one another in a direction parallel to a translation direction (X, Y) of the cart (21) of said feeder (X), and wherein said movable wall (94) is translatable in the translation direction (X), a translation along the translation direction being caused and controlled by said feeder (20).

11. The automatic processing system (1) according to claim 1, wherein said unloading station (80) comprises a conveyor belt (81) mounted on said base or platform (100) and adapted to transport processed workpieces (P), the conveyor belt being moved by said robot (60) in said unloading station, to an area external to the base or platform (100), where the processed workpieces can be picked up and sent for further processing.

\* \* \* \* \*